US009847164B2

(12) United States Patent
Pennander

(10) Patent No.: US 9,847,164 B2
(45) Date of Patent: Dec. 19, 2017

(54) INDUCTOR CORE

(71) Applicant: HOGANAS AB (PUBL), Hoganas (SE)

(72) Inventor: Lars-Olov Pennander, Helsingborg (SE)

(73) Assignee: HÖGANÄS AB (PUBL), Höganäs (SE)

( * ) Notice: Subject to any disclaimer, the term of this patent is extended or adjusted under 35 U.S.C. 154(b) by 168 days.

(21) Appl. No.: 14/654,364

(22) PCT Filed: Dec. 10, 2013

(86) PCT No.: PCT/EP2013/076110
§ 371 (c)(1),
(2) Date: Jun. 19, 2015

(87) PCT Pub. No.: WO2014/095495
PCT Pub. Date: Jun. 26, 2014

(65) Prior Publication Data

US 2015/0340147 A1 Nov. 26, 2015

(30) Foreign Application Priority Data

Dec. 19, 2012 (EP) .................................... 12197982

(51) Int. Cl.
*H01F 21/06* (2006.01)
*H02K 1/22* (2006.01)
(Continued)

(52) U.S. Cl.
CPC ............. *H01F 27/263* (2013.01); *H01F 3/14* (2013.01); *H01F 21/06* (2013.01); *H01F 27/255* (2013.01); *H01F 27/2823* (2013.01)

(58) Field of Classification Search
USPC .................. 336/118, 119, 132, 134; 310/263
See application file for complete search history.

(56) References Cited

U.S. PATENT DOCUMENTS 5,892,313 A * 4/1999 Harris .................. H02K 21/044 310/181
6,348,265 B1 2/2002 Jansson et al.
(Continued)

FOREIGN PATENT DOCUMENTS

FR 68208 E 4/1985
JP 57-24514 A 2/1982
(Continued)

OTHER PUBLICATIONS

International Search Report (PCT/ISA/210) dated Jan. 22, 2014, by the European Patent Office as the International Searching Authority for International Application No. PCT/EP2013/076110.
(Continued)

*Primary Examiner* — Ronald Hinson
(74) *Attorney, Agent, or Firm* — Buchanan Ingersoll & Rooney P.C.

(57) ABSTRACT

An inductor core including a two separate inductor core components which, when assembled with each other, together form the inductor core and define a common axis; wherein the inductor core components form at least one magnetic flux barrier, the magnetic flux barrier having a width in the circumferential direction relative to the common axis; wherein the width is adjustable by rotating the inductor core components relative to each other around the common axis.

22 Claims, 6 Drawing Sheets

(51) Int. Cl.

| | |
|---|---|
| ***H01F 27/26*** | (2006.01) |
| ***H01F 27/255*** | (2006.01) |
| ***H01F 27/28*** | (2006.01) |
| ***H01F 3/14*** | (2006.01) |

(56) References Cited

U.S. PATENT DOCUMENTS

| | | | | |
|---|---|---|---|---|
| 2007/0024153 A1* | 2/2007 | York | H02K 1/243 | 310/263 |
| 2007/0278891 A1* | 12/2007 | Engquist | H02K 1/148 | 310/216.067 |

FOREIGN PATENT DOCUMENTS

| | | | |
|---|---|---|---|
| JP | 02-69910 | A | 3/1990 |
| JP | 08-138943 | A | 5/1996 |
| JP | 2006-216610 | A | 8/2006 |
| WO | WO2012/093040 | A1 | 7/2012 |

OTHER PUBLICATIONS

Written Opinion (PCT/ISA/237) dated Jan. 22, 2014, by the European Patent Office as the International Searching Authority for International Application No. PCT/EP2013/076110.

* cited by examiner a)

b)

a)

b)

INDUCTOR CORE

TECHNICAL FIELD

The present invention relates to inductor cores.

BACKGROUND

Inductors, sometimes also referred to as reactors or chokes, are used in a wide array of applications such as signal processing, noise filtering, power generation, electrical transmission systems etc. In order to provide more compact and more efficient inductors, the electrically conducting winding of the inductor may be arranged around an elongated magnetically conducting core, i.e. an inductor core. An inductor core is preferably made of a material presenting a higher permeability than air wherein the inductor core may enable an inductor of increased inductance.

Inductor cores are available in a large variety of designs and materials, each having their specific advantages and disadvantages. However, in view of the ever increasing demand for inductors in different applications there is still a need for inductor cores having a flexible and efficient design and which are usable in a wide range of applications.

In order to provide a low-reluctance magnetic flux path, inductor cores are usually made of materials having a high magnetic permeability. However, such materials may easily become saturated, especially at higher magnetomotive force (MMF). Upon saturation, the inductance of the inductor may decrease wherein the range of currents for which the inductor core is usable is reduced. A known measure to improve the usable range is to arrange a magnetic flux barrier e.g. in the form of an air gap, in the part of the core about which the winding is arranged. A properly arranged air gap results in a reduced maximum inductance. It also reduces the inductance sensitivity to current variations. The properties of the inductor may be tailored by using air gaps of different widths.

WO2012/093040 discloses an inductor core design suitable for soft magnetic powder material. This prior art inductor core facilitates small tolerances in the manufacturing of the inductor core and, in particular, the air gap. However, it remains desirable to provide an inductor core that can efficiently be manufactured with varying yet well-defined air gap widths.

SUMMARY

According to a first aspect, disclosed herein are embodiments of an inductor core comprising two separate inductor core components which, when assembled with each other, together form the inductor core and define a common axis; wherein the inductor core components form at least one magnetic flux barrier, e.g. between respective surfaces of the two inductor core components, the magnetic flux barrier having a width in the circumferential direction relative to the common axis; wherein said width is adjustable by rotating the inductor core components relative to each other around the common axis.

Embodiments of the inductor core described herein allow for a plurality of more specific inductor core designs, each design having its inherent advantages but all presenting common performance and manufacturing related advantages. In particular, embodiments of the inductor core described herein are suitable for being efficiently manufactured, e.g. by powder metallurgical manufacturing techniques, while facilitating accurate adjustment of the width of the air gap. The circumferential dimensions of the inductor core components are normally defined by the geometry of a mold or die, thus allowing a high precision while the dimensions in the axial direction are defined by the process parameters of the compaction process which allow a less accurate control of the resulting dimensions. Furthermore the dimensions in the circumferential direction may easily be adjusted during manufacturing of the inductor by rotating different components relative to each other around the common axial direction. Hence the provision of a magnetic flux barrier in a circumferential part of the magnetic flux path facilitates both adjustable flux barriers and facilitates a high precision of the barrier dimensions and thus the inductor properties. It will be appreciated that each of the inductor core components may be formed as one piece.

In some embodiments, a first one of the two inductor core components comprises a first set of projections and a second one of the two inductor core components comprises a second set of projections; where the projections of the second set interleave the projections of the first set so as to define a respective flux barrier between each projection of the second set and a respective adjacent projection of the first set. The projections of each set may extend radially and/or axially from a respective base member, thus allowing simultaneous circumferential displacement of the position of all projections of each set by rotating the corresponding base member from which the set of projections extends. The projections may be formed as elongated teeth, e.g. distributed at intervals in a comb-like fashion. In particular, the teeth may be distributed along a circle.

In particular, the inductor core may comprise a first and a second base member and at least a first axially extending core member shaped and sized to provide a magnetic flux path between the first and second base members. Hence, the first base member and the second base member may be provided at opposite ends of the first axially extending core member. The first core member may comprise a first set of projections axially extending from the first base member towards the second base member and a second set of projections axially extending from the second base member towards the first base member; where the projections of the second set interleave the projections of the first set so as to define a respective flux barrier between each projection of the second set and a respective adjacent projection of the first set. Consequently, the magnetic flux through the core member between the first and second base members crosses the flux barrier in the circumferential direction between a projection of the first set and a neighbouring projection of the second set. The width of the flux barrier can conveniently be adjusted by rotating the first base member from which the first set of projections extend relative to the second base member from which the second set of projections extend. Accordingly, a first one of the two separate inductor core components may comprise the first base member and the first set of projections, and a second one of the two inductor core components may comprise the second base member and the second set of projections.

Embodiments of the inductor core disclosed herein allow an adjustment of the dimension of the flux barrier without the need of changing the size or shape of any of the components from which the inductor core is assembled. Consequently, inductors having different flux barrier dimensions and, thus, different properties may be manufactured from a small number of components. This not only facilitates a more efficient manufacturing process but also reduces the number of different tools, such as compaction moulds, for manufacturing components for a variety of inductors having different specifications. When the first and second inductor core components have the same shape and size, the inductor cores may be assembled from a single type of component, thus further increasing the efficiency of the manufacturing process and further reducing the number of required manufacturing tools.

The inductor core may further comprise a second axially extending core member shaped and sized to provide a magnetic flux path between the first and second base members. Hence the first and second core members together with the first and second base members provide a closed-loop flux path comprising a flux barrier of accurately adjustable size. The flux barrier may be provided in either of the two core members or even in both core members.

The second core member may be completely comprised in one of the first and second inductor core components, or it may be partly comprised in both the first and second inductor core components.

The flux barrier may be an air gap or a gap filled with another material having a lower permeability than the material of the first and second inductor core components. Examples of suitable materials for filling the air gap include carton, fibre reinforced plastic, plastic molding material, poly(4,4'-oxydiphenylene-pyromellitimide) (also known as Kapton), meta-aramid material like the one available under the trade name Nomex from DuPont, etc. or combinations thereof.

The term width of the flux barrier is intended to refer to the linear size of the air gap in the direction in which the magnetic flux passes the flux barrier. In embodiments of the inductor core disclosed herein, the width of the air gap is measured in the circumferential direction. The terms axial, radial and circumferential as used herein refer to directions relative to the axis defined by the inductor core components. It will be appreciated that, in some embodiments, the inductor core components may be rotated so as to touch each other, thus causing the width of the flux barrier to be substantially zero. Nevertheless, the interface between the two components still forms a flux barrier. Generally, the width of the barrier may be zero or larger. The desired width may, among other factors, depend on the material of the inductor core components and, in particular, on the permeability of the material of the inductor core components. When the inductor core components are made of low-permeability material it may be desirable to have a small air gap, i.e. a flux barrier having a small reluctance. In some embodiments, it may even be desirable to make the components touch each other so as to minimize the width of the air gap.

Inductor cores as described herein may be manufactured in a variety of sizes. In some embodiments, e.g. in embodiments where the inductor core components are made from compacted powder, the radial dimension of the inductor core may be between 30 mm and 300 mm, such as between 40 mm and 250 mm. The axial dimension of the inductor core may be below 200 mm, e.g. below 100 mm. The inductor core components may have different numbers of projections, e.g. each inductor core component may have between three and ten projections, e.g. 3, 4, 5, 6, 7, 8, 9 or 10 projections.

In some embodiments, the inductor core comprises an inner core member and an outer core member, each axially extending between the first and second base members and providing respective magnetic flux paths between the first end second base members; wherein the outer core member at least partly surrounds the inner core member, thereby defining an outer circumference of a space around the inner core member for accommodating a winding between the inner and the outer core members; wherein at least one of the inner and outer core members comprise said at least one magnetic flux barrier. Hence, the core member including the magnetic flux barrier may be the inner core member or the outer core member, or both, i.e. the first core member may be the inner or the outer core member, and the second core member may be the corresponding other one of the inner and outer core members.

The inner core member may be formed as a cylindrical or a tubular structure or it may have a different cross-sectional shape, e.g. polygonal. The inner core member may be formed by respective first and second inner core members, each extending from a respective one of the first and second base members towards each other. In the assembled inductor core, the first and second projections may abut each other so as to form an elongated inner core member extending from the first to the second base member. Alternatively, the first and second projections may define an air gap between their respective end faces. Hence, an inductor may comprise an air gap in addition to the adjustable tangential air gap described herein. This may be useful in inductors where a large total flux barrier is desired, but where the exact width of the air gap should be adjustable or fine tunable.

The outer core member may form a wall structure circumferentially extending at least partially around the inner core member and the winding of the inductor, thus providing both a flux path between the base members and electromagnetically shielding the inductor. The projections of each set may be distributed—e.g. uniformly distributed—around the circumference defined by the outer core member leaving respective gaps between adjacent projections of the same set. The circumferential width of the gaps is larger than the circumferential width of the projections of the other set of projections. Hence a projection of the second set extending into a gap formed between two adjacent projections of the first set defines at least one gap between one of its lateral side faces and one of the adjacent projections of the first set. Depending on the relative angular position of the projections of the first set relative to the projections of the second set, the gap defined between a projection of the first set and an adjacent projection of the second set varies. When the projection touches one of its neighbouring projections of the other set, a minimum flux barrier is provided, as the magnetic flux may cross directly from one projection to the adjacent projection without having to pass through a material of lower permeability. When the projections are arranged to be positioned circumferentially in the center of a gap between two adjacent projections of the other set, a maximum distance between the projections of the respective sets is provided, thus causing the magnetic flux to cross a maximum distance through a material of lower permeability.

The interleaved projections of the first and second sets may each have a length such that they only partly extend from one base member to the other base member. Consequently, each projection has a first end connected to one of the base members and an opposite free end facing the other base member without touching the other base member but leaving a flux barrier between the free end and the other base member, so as to cause the magnetic flux to cross the circumferential flux barrier gap defined between adjacent interleaved projections. Accordingly, the flux barrier between the free ends of the projections and the end face which they face may be larger than the circumferential flux barrier between adjacent projections. Hence, in some embodiments, the distance between the free end of each projection and the opposite base member is larger than the difference between the distance between two adjacent projections of the same set and the circumferential width of each projection.

The first and second base members may be formed as respective plates, e.g. circular plates, where the inner core member axially extends from a center of the plates, and where the outer core member extends from a peripheral portion of the end plates, and where the base member provides a radial flux path connecting the inner and outer core members.

According to another aspect, embodiments of the inductor core disclosed herein may comprise first and second base members and two core members, one of the core members being an inner core member and the other core member being an outer core member. The inner core member extends between the first and second base member, defining an axial direction of the inductor core. The outer core member at least partly surrounds the inner core member, thereby defining an outer circumference of a space around the inner core member for accommodating a winding between the inner core member and the outer core member. At least one of the core members is shaped and sized to provide a magnetic flux path between the first and second base members through a material having a core permeability, the magnetic flux path having at least a circumferential path portion; wherein the at least one core part further comprises one or more magnetic flux barriers in the circumferential path portion having a barrier permeability smaller than the core permeability.

The inductor core may comprise a first inductor core component and a second inductor core component, each formed as a single piece, the first inductor core component comprising the first base member, the first set of projections, and the second inductor core component comprising the second base member, and the second set of projections. Hence, a convenient manufacturing process is facilitated, and the two inductor core components may easily be assembled so as to form the conductor core, and easily rotated around a common axis so as to adjust the size of the air gap.

By the configuration of the members a magnetic flux path of low reluctance may be obtained. The outer core member at least partly surrounding the core member may thus provide the double effect of confining a magnetic flux, generated by a current flowing in the winding, to the inductor core and thereby minimize or at least reduce interference with the surroundings while acting as a flux conductor.

A magnetic field tends to spread in directions perpendicular to the direction of the flux path when the magnetic flux is forced across the air gap. This spreading of flux is generally referred to as the “fringing flux”. A small, or narrow, air gap tends to fringe the field less than a large, or wide, air gap. The air-gap fringing decreases the flux reluctance and thereby increases the inductance of the inductor. However, if this magnetic fringing flux changes over time and the field overlaps the wire geometry, eddy-currents are generated in the surrounding winding wires, causing the winding losses to increase.

Suboptimal arrangement of the air gap may hence entail efficiency losses due to fringing flux at the air gap interacting with the winding. In some embodiments, the radial width of the projections may vary along the circumferential direction, thus allowing a reduction of flux leakage.

In some embodiments the shape and/or size of the projections and/or of the flux barriers defined between the inductor core components may vary so as to provide different flux paths of respective reluctances.

Embodiments of the inductor core described herein are well-suited for production by Powder Metallurgy (P/M) production methods. Accordingly, in some embodiments, the inductor core is made from a soft magnetic material such as compacted soft magnetic powder, thereby simplifying the manufacturing of the inductor core components and providing an effective three-dimensional flux path in the soft magnetic material allowing e.g. radial, axial and circumferential flux path components in a inductor core. Here and in the following, the term soft magnetic is intended to refer to a material property of a material that can be magnetized but does not tend to stay magnetized, when the magnetising field is removed. Generally a material may be described as soft magnetic when its coercivity is no larger than 1 kA/m (see e.g. “Introduction to Magnetism and Magnetic materials”, David Jiles, First Edition 1991 ISBN 0 412 38630 5 (HB), page 74).

The term “soft magnetic composites” (SMC) as used herein is intended to refer to pressed/compacted and heat-treated metal powder components with three-dimensional (3D) magnetic properties. SMC components are typically composed of surface-insulated iron powder particles that are compacted to form uniform isotropic components that may have complex shapes in a single step.

The soft magnetic powder may e.g. be a soft magnetic Iron powder or powder containing Co or Ni or alloys containing parts of the same. The soft magnetic powder may be a substantially pure water atomised iron powder or a sponge iron powder having irregular shaped particles which have been coated with an electrical insulation. In this context the term “substantially pure” means that the powder should be substantially free from inclusions and that the amount of the impurities such as O, C and N should be kept at a minimum. The weight-based average particle sizes may generally be below 300 μm and above 10 μm.

However, any soft magnetic metal powder or metal alloy powder may be used as long as the soft magnetic properties are sufficient and that the powder is suitable for die compaction.

The electrical insulation of the powder particles may be made of an inorganic material. Especially suitable are the type of insulation disclosed in U.S. Pat. No. 6,348,265 (which is hereby incorporated by reference), which concerns particles of a base powder consisting of essentially pure iron having an insulating oxygen- and phosphorus-containing barrier. Powders having insulated particles are available as Somaloy® 500, Somaloy® 550 or Somaloy® 700 available from Höganas AB, Sweden.

Embodiments of the inductor core described herein offer tolerance related advantages during manufacturing. The first and second inductor core components may be manufactured by uniaxial compaction of the soft magnetic powder material. In particular, the inductor core components may be manufactured by molding the soft magnetic powder material and the molding may include compacting the powder material by pressing in a direction corresponding to the axial direction of each respective inductor core component. In the radial and circumferential direction, the dimensions of the components are limited by the cavity walls of the mold/die. The components may thus be manufactured using uniaxial compaction with a much tighter tolerance in the circumferential direction than in the axial direction. Consequently the manufactured members may present dimensions in the circumferential direction with high accuracy. This is advantageous since it enables an accurate match to be achieved between the inductor core components relatively to each other in the circumferential direction, thus allowing for an accurate determination of the circumferential dimension of the gaps or other flux barrier between the components, which in turn enables good precision of the inductance in the final inductor product. This degree of precision would be very difficult to achieve when manufacturing a compacted inductor core with an axially extending air gap.

According to one embodiment, the first and second inductor core components are separate components which are adapted to be assembled and together form the magnetic flux path extending through the inner and outer core members and the base members. Consequently, each component may be separately manufactured in a convenient manner. As described above, each component may be made of a soft magnetic powder material, such as surface-insulated soft magnetic powder, thus allowing an efficient production using single-level tooling.

Moreover, the modular design of the inductor core further enables a hybrid design of the inductor core wherein each core component may be made from the most appropriate material. In particular, the different components of the inductor may be made of the same or of different material. Examples of suitable materials include compacted powder, laminates, etc. Furthermore, the present description is mainly concerned with the components of an inductor and, in particular, of the inductor core that perform a magnetic function and are thus made of a material having suitable magnetic properties. It will be appreciated, however, that an inductor may comprise additional structural components without a magnetic function; such structural components may generally be made of non-magnetic material.

According to one embodiment, the base member presents an axial dimension which decreases in an outward radial direction. Since the circumference of the base member increases along the outward radial direction, the axial dimension of the base member may be gradually reduced while maintaining the same flux conducting cross-sectional area as at the interface between the base member and the core member. The amount of material required for the base member may thus be reduced without adversely affecting the efficiency.

Moreover, the inductor core components enable a closed inductor core design efficiently shielding the magnetic flux generated by the winding currents from the surrounding.

The present disclosure relates to different aspects including the inductor core described above and in the following, corresponding methods, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein are embodiments of a method of adjusting a width of a magnetic flux barrier of an inductor core as disclosed herein. Embodiments of the method comprise rotating the inductor core components relative to each other around a common axis so as to adjust a width of the magnetic flux barrier. This process may e.g. be performed during manufacturing of the inductor core, e.g. after assembling the inductor core components and a winding so as to form an inductor. The inductor core components may subsequently be secured in a selected configuration, i.e. a selected circumferential position relative to each other, e.g. by overmolding the inductor with a suitable material, e.g. a non-magnetic material, by securing the components by a set screw, or any other suitable bonding or fastening means.

BRIEF DESCRIPTION OF THE DRAWINGS

Embodiments of the various aspects disclosed herein, as well as additional objects, features and advantages of the present inventive concept, will be described in more detail in the following illustrative and non-limiting description of embodiments of the aspects disclosed herein with reference to the appended drawings, where like reference numerals refer to like elements unless stated otherwise, wherein.

DETAILED DESCRIPTION OF PREFERRED EMBODIMENTS

Figure 1:
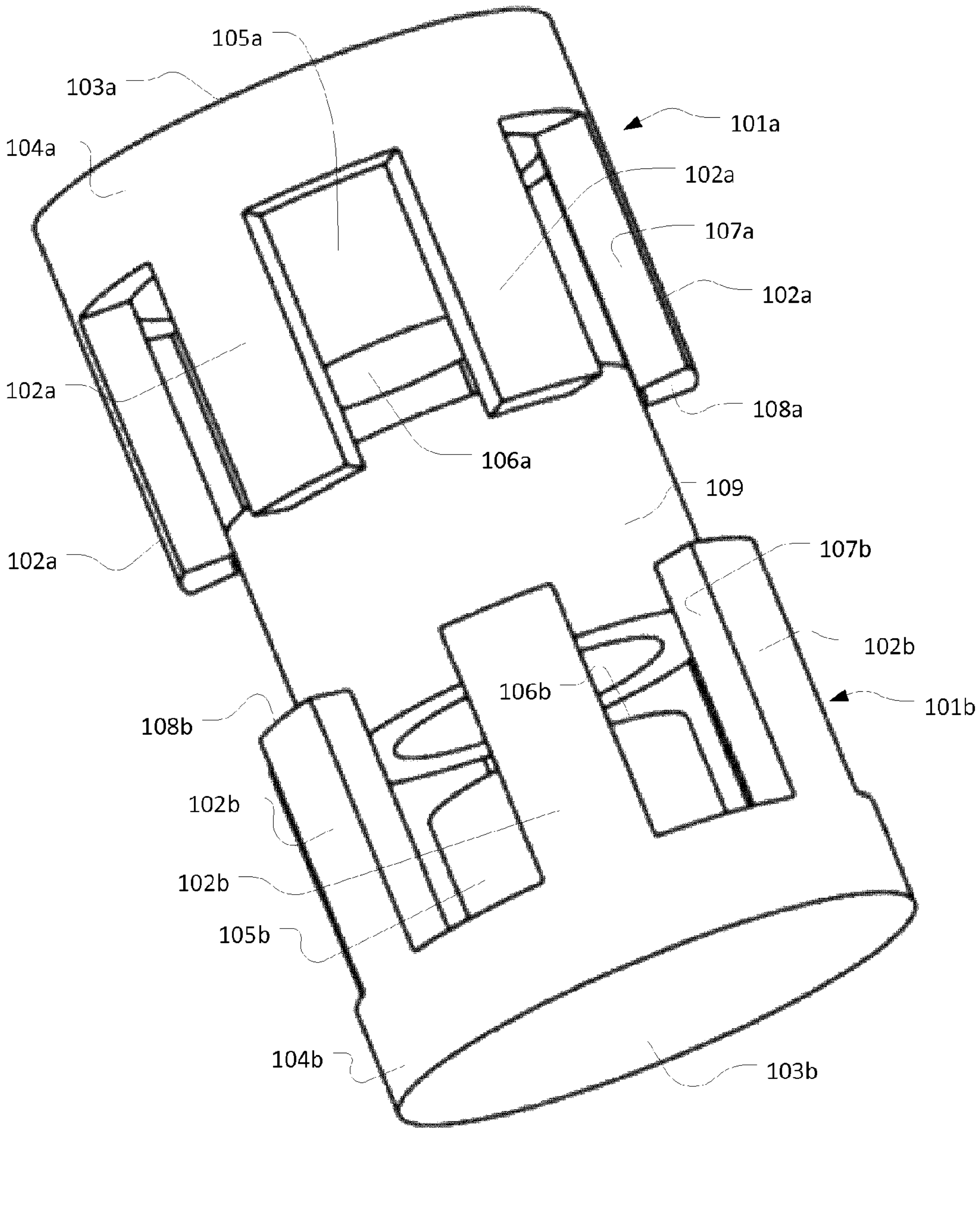
FIG. 1 shows a schematic exploded view of an embodiment of an inductor.

FIG. 1 is a schematic exploded view of an embodiment of an inductor comprising an inductor core and a winding 109. The inductor core is formed by two separate inductor core components 101*a* and 101*b*, respectively.

A first one (101*a*) of the two inductor core components comprises a base member 103*a*, an inner core member 105*a*, and a set of projections 102*a*. The base member 103*a* has the form of a circular disc defining a periphery 104*a*. The inner core member section 105*a* extends axially from a center of the base member 103*a*. In the present example, the inner core member section has a cylindrical shape. However, it will be appreciated that the inner core member section may have a different shape, e.g. a polygonal cross-section. The base inner core member section 105*a* is arranged coaxially with the base member 103*a*. The projections 102*a* extend axially from the base member 103*a* and are distributed along the periphery 104*a* of the base member 103*a*, leaving a radial gap between the inner core member section 105*a* and the projections 102*a*. The projections 102*a* extend in the same direction as the inner core member section 105*a*. The projections 102*a* are spaced apart from each other in the circumferential direction, thus defining gaps between adjacent projections, the gaps being delimited by the lateral side faces 107*a* of the projections. In the example of FIG. 1, the projections 102*a* all have the same shape and size and they are uniformly distributed along the periphery 104*a*, i.e. all gaps between adjacent projections have the same size. The set of projections 102*a* thus together form a part of an outer core member surrounding the inner core member section 105*a*. The inner core member section 105*a* and the set of projections 102*a* together define a space between the inner core member section 105*a* and the set of projections 102*a* for accommodating the winding 109. Each projection 102*a* is formed as a segment of a tubular wall, so that the set of projections together form a tubular wall having axially extending slots. The axial length of the inner core member section 105*a* is shorter than the axial length of the projections 102*a*.

It will be appreciated that, in alternative embodiments, the shape and/or arrangement of the various parts of the inductor core component 101*a* may be different. For example, the projections may have a different shape, they may have shapes and/or sizes different from each other, the gaps between adjacent projections may not all have the same size, etc.

In the example of FIG. 1, the second inductor core component 101*b* has the same shape and size as the first inductor core components 101*a*, i.e. the second inductor core component 101*b* comprises a base member 103*b*, an inner core member section 105*b*, and a set of projections 102*b* extending from a periphery 104*b* of the base member 103*b*, all as described in connection with the first inductor core component 101*a*. It will be appreciated however, that other embodiments of an inductor core may comprise two inductor core components of different shapes. For example, only one of the components may comprise an inner core member section which then may be sufficiently long so as to axially extend all the way to the base member of the other inductor core component in the assembled inductor core. Alternatively or additionally, the projections of the two components may have different shapes and sizes.

The two inductor core components 101*a* and 101*b* are adapted to be assembled axially aligned and with their respective inner core member sections 105*a,b* facing each other and such that the projections extend into the gaps formed by the projections of the other component, i.e. such that the projections of one component are interleaved with the projections of the other component.

The inner core member sections 105*a* and 105*b* may touch each other with their respective front faces 106*a* and 106*b* in the assembled indictor core so as to form an inner core member extending all the way between the base members 103*a* and 103*b*, respectively. In some embodiments, the inner core member sections 105*a,b* may define an axial flux barrier, e.g. in the form of an axially extending gap between them and/or in the form of a part of one or both inner core member sections comprising a material of lower permeability.

Together, the interleaved projections 102*a,b* of the two inductor core components 101*a,b* form an outer core member having the form of an outer tubular wall that surrounds the inner core member thereby forming a radially and axially extending space between the inner core member and the outer core member, which space is for accommodating the winding 109.

The winding 109 has a tubular shape and is sized such that it surrounds the inner core member and fits in the space between the inner and outer core member. The inductor core may further comprise a winding lead-through and/or other features (not shown so as to simplify the illustration). The lead-through may be arranged e.g. in the outer core member or in one of the base members.

The inductor core components 101*a* and 101*b* may each be made of compacted magnetic powder material. The material may be soft magnetic powder. The material may be ferrite powder. The material may be surface-insulated soft magnetic powder, e.g. comprising iron particles provided with an electrically insulating coating. The resistivity of the material may be such that eddy currents are substantially suppressed. As a more specific example, the material may be a soft magnetic powder, e.g. from the product family Somaloy (e.g. Somaloy® 110i, Somaloy® 130i or Somaly® 700HR) from Hoeganaes AB, S-263 83 Hoeganaes, Sweden.

The soft magnetic powder may be filled into a die and compacted. The material may then be heat treated, e.g. by sintering (for powder materials such as ferrite powder) or at a relatively low temperature so as not to destroy an insulating layer between the powder particles (for soft magnetic composites). During the compaction process a pressure may be applied in a direction corresponding to the axial direction of the respective member. In the radial and circumferential directions the dimension of the components are defined by the cavity walls of the mold. Each component may thus be manufactured using uniaxial compaction with a tighter tolerance in the radial and circumferential directions than in the axial direction.

Alternatively, the inductor core components may be made from a different material of a sufficiently high permeability, higher than the permeability of air, and/or assembled from a plurality of individual pieces rather than formed in a single piece.

Figure 2:
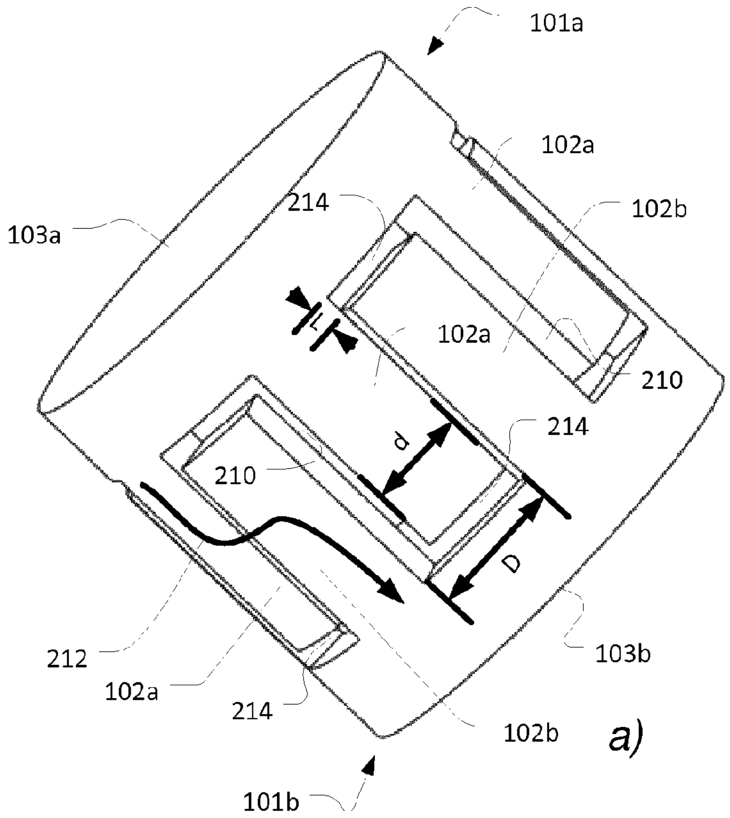
FIGS. 2*a-b* are illustrations of an inductor core in assembled condition.
Figure 2:
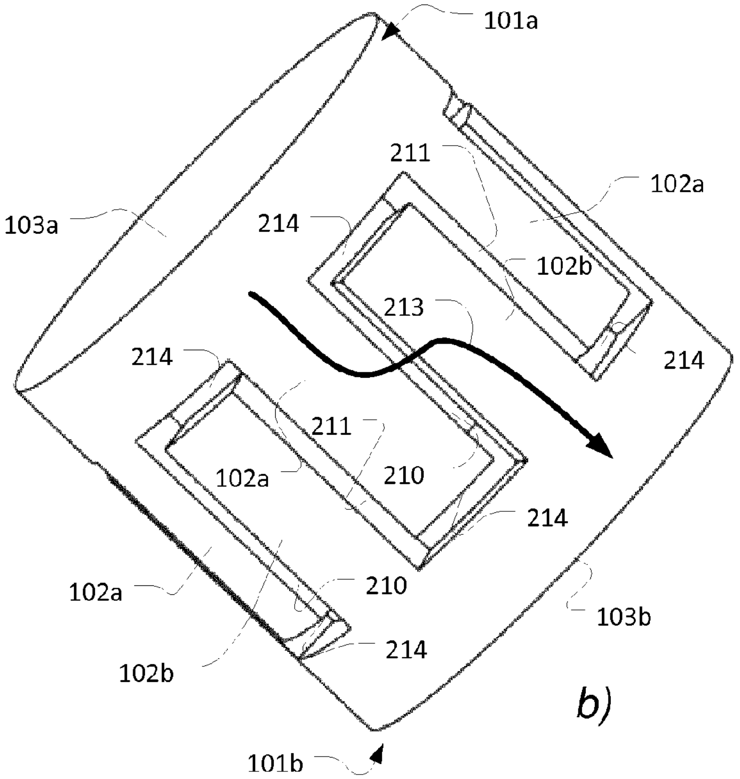

FIGS. 2*a-b* are illustrations of an inductor core in assembled condition. Once the inductor core is assembled, the interleaved projections 102*a,b* of the two inductor core components 101*a,b* form a tubular wall having axially extending slots 210 and 211 between respective projections of one of the two inductor core components and an adjacent one of the projections of the other inductor core component. These slots are formed, because the projections of each component have a width d, measured in the circumferential direction, that is smaller than width D (also measured in the circumferential direction) of the gap between adjacent projections of the respective other component.

Depending on the angular position of the two inductor core components 101*a,b* relative to each other, the slots cause the magnetic flux through the outer core member from one base member to the other to cross a flux barrier in the form of an air gap, where the size of the air gap (in the circumferential direction) depends on the relative angular position of the inductor core components with respect to each other.

In the example of FIG. 2*a*, the inductor core components are oriented such the each projection 102*a* of one inductor core component touches an adjacent projection 102*b* of the other inductor core component, i.e. respective lateral surfaces 107*a,b* of the projections touch each other. Consequently, a magnetic flux path exists between the base members through the outer core member such that the entire flux path extends through the material of the inductor core members, as indicated by the arrow 212 in FIG. 2*a*. As can be seen, the flux path crosses the touching surfaces between two of the projections.

FIG. 2*b* shows the inductor core where the inductor core components 101*a,b* are rotated to a different relative angular position with respect to each other such that each projection is separated from both its adjacent projections of the other inductor core component by respective gaps 210, 211. Consequently, the magnetic flux between the base members through the outer core member has to cross a gap between adjacent projections, as indicated by arrow 213.

The size of the smallest gap which the flux has to cross may be continuously varied by rotating the inductor core components 101*a,b* relatively to each other around their common axis. It will be appreciated that the smallest gap size may be varied between 0 mm (as in the example of FIG. 2*a*) and a maximum gap size equal to (D−d)/2 which occurs when each projection is positioned exactly in the center between two adjacent projections of the respective other inductor core component. Typical maximal gap sizes may range between 1 mm and 8 mm. However, other gap sizes may be possible, depending on the desired properties of the inductor. It will be appreciated that when the gaps formed on respective sides of a projection have different width, the magnetic flux will predominantly flow across the narrower one of the gaps. Hence, the effective gap width is normally defined by the smallest one of the gaps.

As can most clearly be seen in FIG. 2*a*, in this example the inner core member sections 105*a* and 105*b* touch each other in the assembled inductor core (for reasons of simplicity of the illustration, in FIGS. 2*a-b* the inductor core is shown without the winding). Furthermore, the projections 102*a,b* have an axial length small enough so as to cause them to only partially extend towards the base member of the respective other inductor core component when the inductor core components are assembled with their inner core member sections touching. Hence a gap 214 is formed between a free end 108*a,b* of each projection and the respective other inductor core component. This gap may have a width L (measured in the axial direction). It will thus be appreciated that the maximum obtainable gap size between the inductor core components may be the smaller of L and (D−d)/2.

In the assembled condition, the inductor core of FIGS. 1 and 2*a-b* thus provides a closed loop flux path extending axially from one base member to the other through the inner core member, radially inwards within one of the base members, radially outwards within the other base member, and axially and partially circumferentially in the outer core member. The closed loop flux path crosses a flux barrier formed by the gap(s) 201 and/or 211 between adjacent projections where the gap width of the gap is adjustable by rotating the inductor core components relatively to each other around their common axis.

Hence, inductors having different inductance properties may be manufactured using the same inductor core components. To this end, during manufacture, the inductor core components and the winding may be assembled, the inductor core components may be rotated relatively to each other so as to adjust the gap size to a desired value, and by securing the inductor core components in their desired position relative to each other, e.g. by gluing the components together, by filling the gaps with a desired curable material of sufficiently low permeability, and/or the like. Generally, the gaps 210, 211 and/or 214 may be filled with air, wherein the magnetic flux barrier is formed as an air gap. Alternatively, some or all of the gaps may be filled with a material presenting a significantly reduced magnetic permeability compared to the material of the indictor core components. By way of example, the material may be a plastic material, a rubber material or a ceramic material.

As will be understood by those skilled in the art, it is much more feasible to accurately adjust the size of the gaps 210 and 211 by rotating the inductor core components relatively to each other than to reduce the acceptable manufacturing tolerance interval of the components in the axial direction.

Furthermore, as mentioned above, the tolerance interval in the circumferential direction may be made relatively tight. Thus, also the circumferential width of the projections and the circumferential width of the gaps between them may be accurately defined. Since the inductance of a final inductor depends on the total length of the flux path and the size of the flux barrier, the design according to the inductor core enables manufacturing of inductors presenting a precise inductance.

Figure 3:
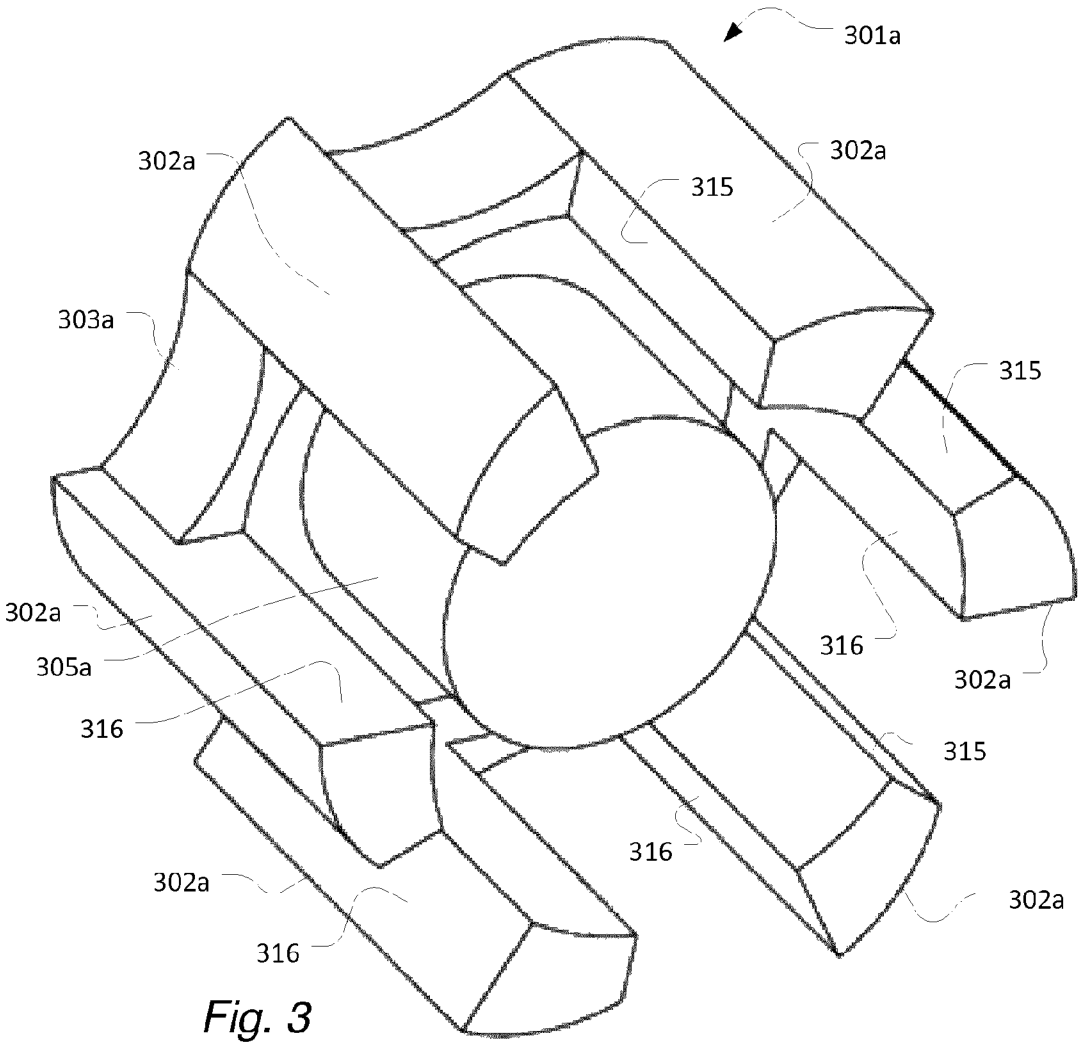
FIG. 3 shows a schematic view of another embodiment of an inductor core component.

FIG. 3 shows a schematic view of another embodiment of an inductor core component. The inductor core component 301*a* of FIG. 3 is similar to the indictor core component 101*a* shown in FIG. 1 in that it comprises a base member 303*a*, and inner core member section 305*a*, and a set of projections 302*a*, all as described in connection with the inductor core component 101*a* of FIG. 1, except that the base member 303*a* and the projections 302*a* have a different shape. In particular the base member 303*a* is a plate defining a circumference that has alternating convex and concave portions. Furthermore, the projections 302*a* have a radial width that varies in the circumferential direction, i.e. the projections have a narrow lateral side 315 having a smaller radial width than the other, broader lateral side 316.

Figure 4:
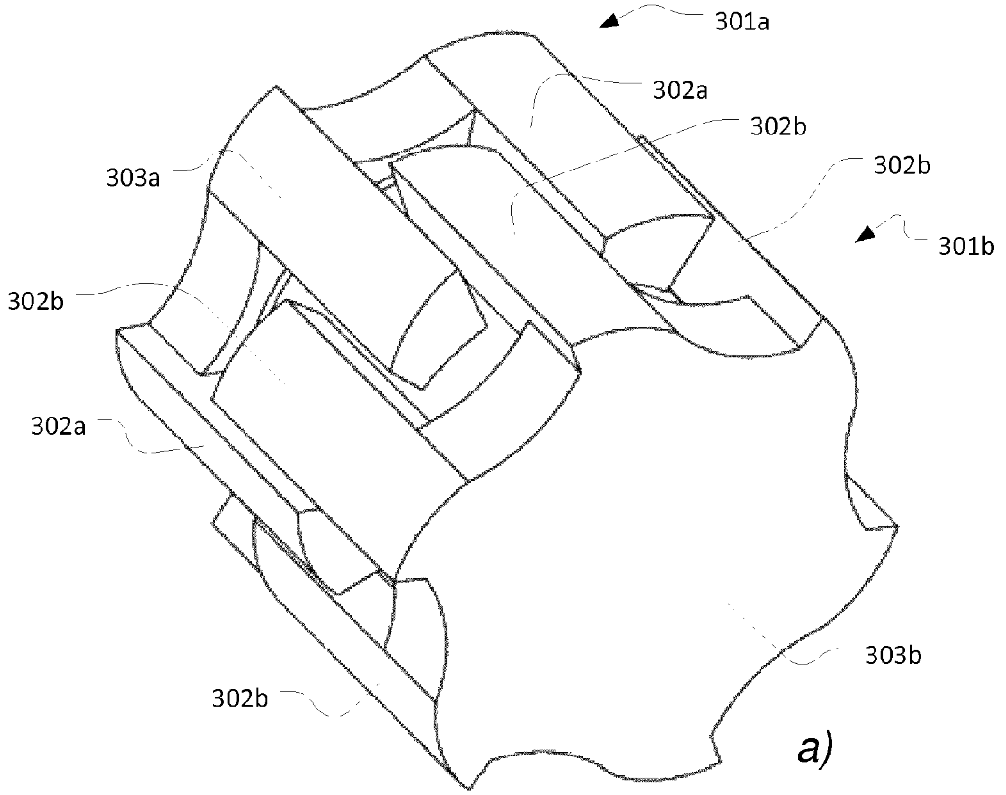
FIG. 4 is an illustration of an inductor core in assembled condition.
Figure 4:
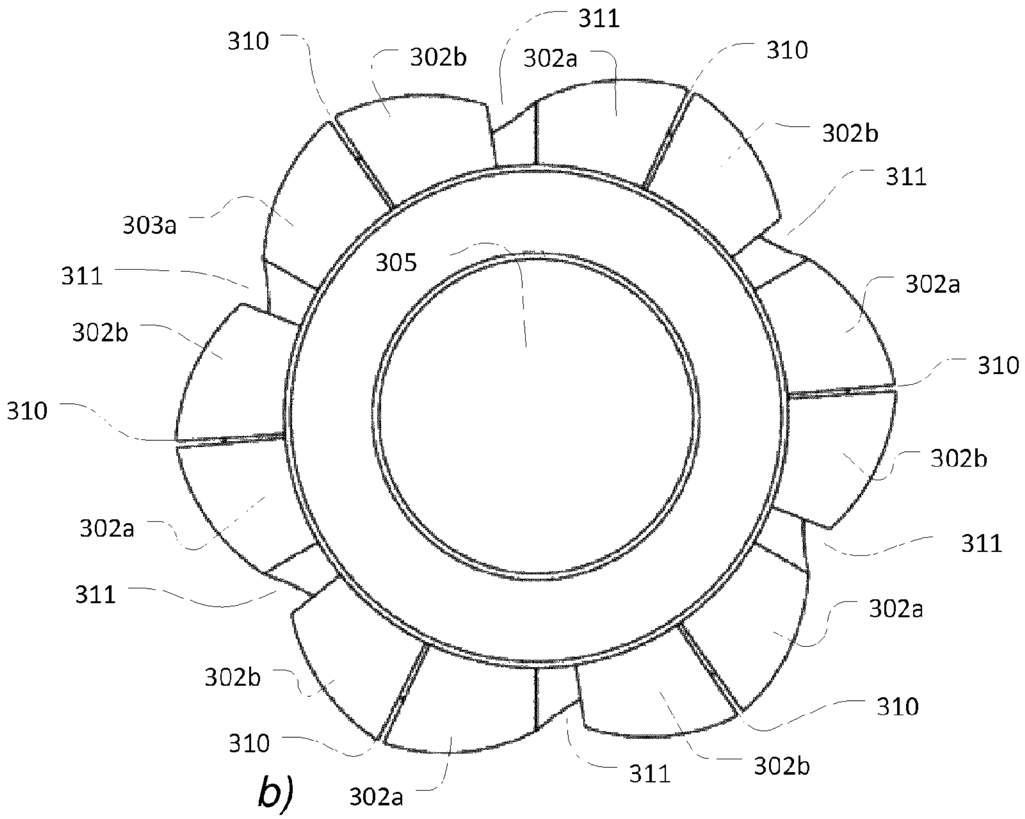

FIG. 4 is an illustration of an inductor core in assembled condition where that inductor core comprises two inductor core components 301*a* and 301*b*, each as described in connection with FIG. 3. In particular, FIG. 4*a* shows a 3D view of the assembled inductor core, while FIG. 4*b* shows a cross sectional view of the inductor core. The inductor core components 301*a* and 301*b* have the same size and shape, each comprising a base member 303*a,b*, respectively, projections 302*a,b*, respectively, and inner core member sections together forming an inner core member 305. Consequently in the assembled inductor core the inductor core components may be arranged such that the air gap 310 having the smallest reluctance is formed by two adjacent projections facing each other with their respective broad lateral side surface 316. The opposite, narrow lateral side face 315 of each projection thus faces a narrow side face of another projection. However, the gap 311 between the narrow side faces may be selected to be larger than the gap between two broad side faces. Consequently, the reluctance of the gap defined between the narrow side faces is considerably larger than the reluctance of the gap between the broad side faces. Consequently, the reluctance of the inductor may be controlled more accurately, and flux leakage is reduced.

Figure 5:
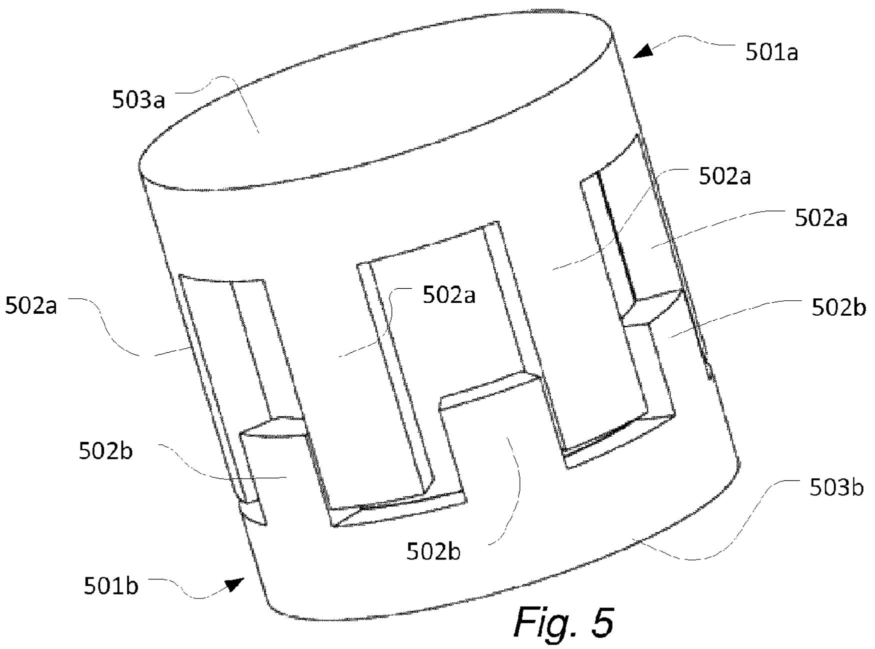
FIGS. 5-6 show further embodiments of an inductor core.

FIG. 5 shows another embodiment of an inductor core. The inductor core of FIG. 5 is similar to the inductor core of FIG. 1 in that the inductor core comprises two separate inductor core components 501*a* and 501*b*, respectively. Both inductor core components comprise a base member 503*a,b*, respectively, an inner core member section (not explicitly shown), and a set of projections 502*a,b*, respectively, all as described in connection with FIG. 1. However, the embodiment of FIG. 5 differs from the embodiment of FIG. 1 in that the inductor core components 501*a,b* have different shapes. In particular, the projections 502*a* of one of the inductor core components 501*a* are longer than the projections 502*b* of the other inductor core component 501*b*.

Figure 6:
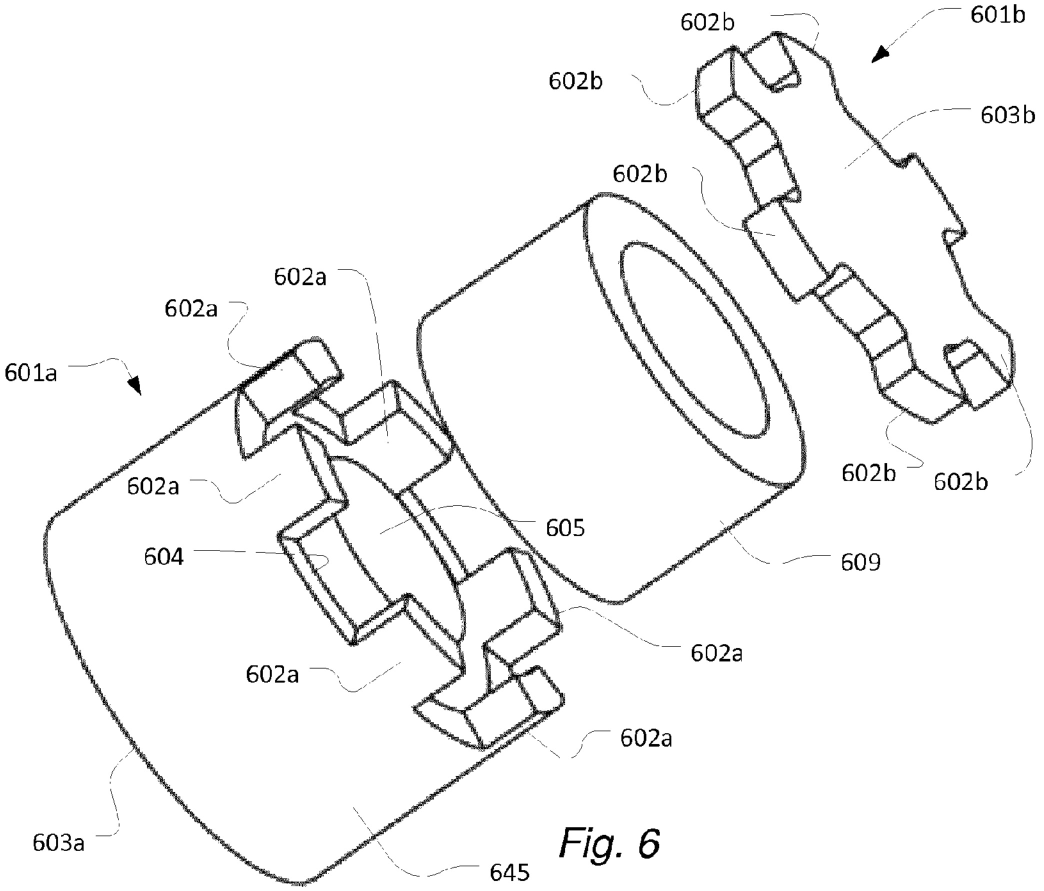

FIG. 6 shows yet another embodiment of an inductor. The inductor of FIG. 6 is similar to the inductor of FIG. 1 in that the inductor comprises a tubular winding 609 and an inductor core formed by two separate inductor core components 601*a* and 601*b*, respectively. In the example of FIG. 6, the inductor core component 601*a* is similar to the inductor core components of FIG. 1 in that it comprises a base member 603*a*, an inner core member section 605*a*, and a set of projections 602*a*. The base member 603*a* has the form of a circular disc. The inner core member 605 extends axially from a center of the base member 603*a*. A tubular circumferential wall 645 extends axially from a periphery of the base member 603*a* leaving a radial gap between the inner core member 605 and the wall 645. The wall defines a periphery 604 facing away from the base member. Axial projections 602*a* are distributed along the periphery 604. The projections 602*a* extend in the same direction as the inner core member 605. The projections 602*a* are spaced apart from each other in the circumferential direction, thus defining gaps between adjacent projections. The wall 645 and the set of projections 602*a* thus together form an outer core member surrounding the inner core member 605. The axial length of the inner core member section 605 is shorter than the axial length of the wall 645 including the projections 602*a*. The second inductor core component 601*b* is formed as a disc 603*b* having radial projections 602*b* extending radially outward from the periphery of the disc. The inductor core component 601*b* thus forms a lid of the inductor core component 601*a* where the axial projections 602*a* interleave the radial projections 602*b* and axially extend into the gaps formed between the radial projections of the inductor core component 601*b*. When assembled, the inner core member 605*a* touches the disc 603*b*.

The circumferential width of the radial projections 602*b* is smaller than the size of the gaps formed between adjacent axial projections 602*a*. Furthermore, the radial length of the projections 602*b* is larger than the radial wall thickness of the axial projections 602*b*. Consequently, when the inductor core component 601*b* is assembled with the inductor core component 601*a*, an air gap is formed between the radial projections 602*b* and the axial projections 602*a*. In particular, a tangential air gap is formed between each radial projection 602*b* and the side walls of the adjacent axial projections 602*a*. By rotating the inductor core component 601*a* relative to the inductor core component 601*b* around their common axis, the width of the tangential gap may be adjusted in a similar fashion as described in connection with the previous embodiments.

Even though both components of the inductor core of FIG. 6 may be made of compacted soft magnetic powder, they may also be made of different material. For example, the disc-shaped component 601*b* may be made of laminate. In such an embodiment, the disc-shaped component 601*b* may be formed as an annular disc having a central hole for receiving the inner core member section 605 which, in turn is shaped and sized to extend through the central hole. Hence, in such an embodiment, the annular disc-shaped component mainly provides a two-dimensional flux path in the radial and circumferential directions.

Figure 7:
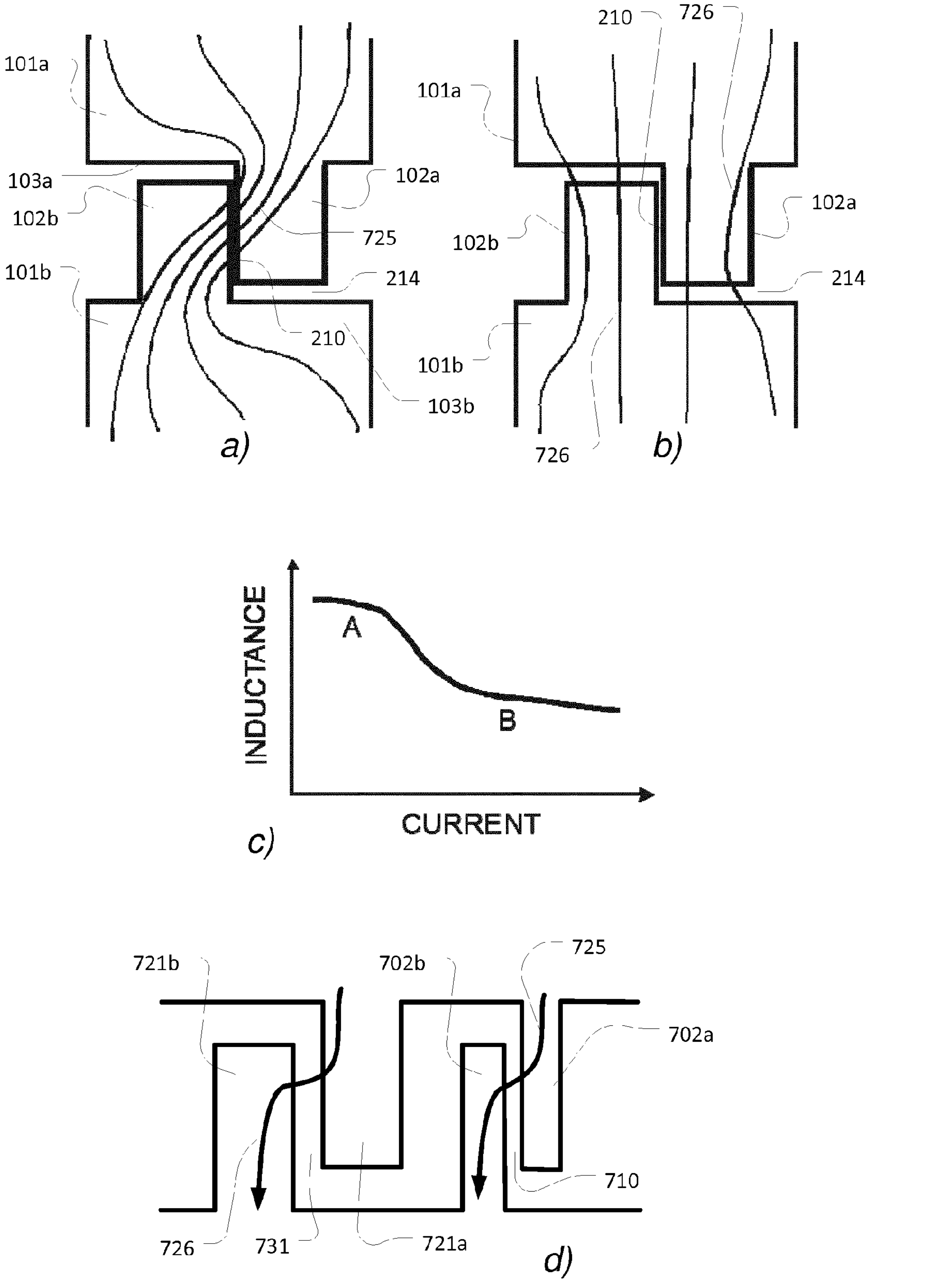
FIG. 7 illustrates examples of an inductor core configured to have an inductance that changes with the current loading.

FIG. 7 illustrates examples of an inductor core configured to have an inductance that changes with the current loading; such an arrangement is also referred to as a 'swinging choke'. The change of inductance is caused by partial saturation of the magnetic core due to the core geometry. The dimensions of the core, in particular the size of the projections and the tangential and axial gaps between the inductor core components, may be selected to provide a partial low reluctance path that will establish the high initial low load inductance. This low reluctance path will typically start to saturate as the current loading is increased. As the flux path saturates there will be alternative paths for the flux that is now directed to a higher reluctance that will reduce the inductance. It is possible to stabilize these two induction levels with an appropriate design of the air-gap sections.

FIGS. 7*a-b* schematically show parts of an inductor core, e.g. the inductor core of FIG. 1, comprising inductor core components 101*a,b* from which respective tooth-like projections 102*a,b* extend. The projections 102*a,b* define tangential air gaps 210 between them and respective gaps 214 between an end portion of the teeth and a base member 103*a,b* of the respective other inductor core component. The tangential gaps 210 are narrower than the axial gaps 214.

FIG. 7*a* illustrates a low reluctance path 725 crossing the tangential air gap 210 between adjacent projections 102*a, b*. As illustrated in FIG. 7*b*, when the current load is increased, the core material through which the low conductance path passes at least partially saturates, causing the flux to be forced to on a different path 726 which crosses the gap 214 and has a higher reluctance, as the gap 214 dominates the reluctance. Consequently with increasing current load, the inductance of the inductor decreases, e.g. as schematically illustrated in FIG. 7*c*. The inductance decreases between a high-inductance, low-power mode "A" where the inductance is dominated by the flux path 725 and a low-inductance, high-power mode "B" where the inductance is dominated by flux path 726.

One reason for using a swinging choke is to provide further harmonic reduction when the inductor is operated at low power in an application like e.g. a switch mode power electronic circuit.

It will be appreciated that, in alternative embodiments, alternative flux paths may be provided by suitable arrangement of projections and air gaps of different sizes, e.g. as illustrated in FIG. 7*d*. FIG. 7*d* schematically shows parts of an inductor core as illustrated in FIG. 7*a*. However in this example, the set of projections comprises one or more narrow projections 702*a,b* having a smaller tangential width than the remaining projections 721*a,b* and forming a smaller air gap 710 between them than the corresponding tangential air gaps 731 between the remaining projections 721*a,b*. As in the example of FIGS. 7*a-b*, this inductor provides a low-power flux path 725 through the narrow projections 702*a,b* and crossing the narrow air gap 710. At higher currents, saturation of the narrow projections occurs, and the flux will increasingly follow the path 726 through the broader projections 721*a, b* and the wider air gap 731.

Although some embodiments have been described and shown in detail, the invention is not restricted to them, but may also be embodied in other ways within the scope of the subject matter defined in the following claims. In particular, it is to be understood that other embodiments may be utilised, and that structural and functional modifications may be made without departing from the scope of the present invention. For example, in the above, inductor cores presenting a cylindrical geometry have been disclosed. However, the inventive concept is not limited to this geometry. For example, the inductor cores may present an oval, triangular, square or polygonal cross section. Similarly, in the embodiments described above, the lateral side faces of the adjacent projections that define the air gap have been shown to be parallel to each other, i.e. the side faces have been shown to be axially-radially oriented. It will be appreciated, however, that the side faces may be chosen not to be parallel to each other, thus providing an air gap having a varying width. Other variations are possible as well, e.g. side faces having a step, so as to provide an air gap having two different widths. Such air gaps having varying widths are also referred to as swing choke and allow the design of inductors having desired inductance properties at different currents.

Embodiments of the inductor core described herein may be used in a variety of applications including photovoltaic applications, in power conversion units, voltage control units, filter units such as LC or LCL filters, etc. Embodiments of the inductor core described herein may be used in systems operating at a variety of power levels, e.g. larger than 500 W such as larger than 1 kW. In particular, when embodiments of the inductor core described herein are used in a multi-phase system, e.g. a 3-phase system, inductors used in different phases may accurately and conveniently be configured to have as similar properties as desirable.

In device claims enumerating several means, several of these means can be embodied by one and the same structural component. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. An inductor core comprising two separate inductor core components which, when assembled with each other, together form the inductor core and define a common axis; wherein the inductor core components form at least one magnetic flux barrier, the magnetic flux barrier having a width in the circumferential direction relative to the common axis; wherein said width in the circumferential direction is configured to be adjustable in a range from a position in which a first one of the two conductor core components contacts a second one of the two conductor core components to a position in which the first conductor core component is out of contact with the second conductor core component by rotating the inductor core components relative to each other around the common axis; wherein a first one of the two inductor core components comprises a first set of projections and a second one of the two inductor core components comprises a second set of projections; wherein the projections of the second set interleave the projections of the first set so as to define a respective flux barrier between each projection of the second set and a respective adjacent projection of the first set; and wherein the first set of projections comprise at least three projections.

2. The inductor core of claim 1, wherein the two inductor core components have the same shape and size.

3. The inductor core of claim 1, wherein the inductor core components are made of a soft magnetic powder material.

4. A method of adjusting a width of a magnetic flux barrier of an inductor core as defined in claim 1; the method comprising rotating the inductor core components relative to each other around a common axis so as to adjust a width of the magnetic flux barrier.

5. The inductor core of claim 1, wherein the first inductor core component comprises a first base member, wherein the second inductor core component comprises a second base member, and wherein the inductor core comprises at least a first axially extending core member shaped and sized to provide a magnetic flux path between the first and second base members.

6. The inductor core of claim 1, wherein the magnetic flux barrier extends in a direction that is parallel with the common axis.

7. The inductor core of claim 1, wherein the projections of the first and second set of projections are rectangular-shaped.

8. The inductor core of claim 1, wherein the first inductor core component comprises a first base member, wherein the second inductor core component comprises a second base member; wherein the inductor core further comprises an inner core member and an outer core member, each axially extending between the first and second base members and providing respective magnetic flux paths between the first and second base members; wherein the outer core member at least partly surrounds the inner core member, thereby defining an outer circumference of a space around the inner core member for accommodating a winding between the inner and the outer core members; and wherein at least one of the inner and outer core members comprise said at least one magnetic flux barrier.

9. The inductor core of claim 8, wherein the outer core member comprises the first and second sets of projections defining a respective gap between each projection of the second set and a respective adjacent projection of the first set.

10. The inductor core of claim 9, wherein each projection has a radial width that varies along the circumferential direction.

11. The inductor core of claim 8, wherein a flux conducting cross-sectional area of the outer core member exceeds a flux conducting cross-sectional area of the inner core member.

12. The inductor core of claim 1, wherein the first set of projections each comprise a first lateral side face and a second lateral side face and wherein for at least one of the first set of projections, the first lateral side face is broader in a radial direction than the second lateral side face.

13. The inductor core of claim 12, wherein the second set of projections each comprise a first lateral side face and a second lateral side face, wherein for at least one of the second set of projections, the first lateral side face is broader in a radial direction than the second lateral side face, wherein the first lateral side face of the at least one of the first set of projections faces the first lateral side face of the at least one of the second set of projections.

14. An inductor core comprising two separate inductor core components which, when assembled with each other, together form the inductor core and define a common axis; wherein the inductor core components form at least one magnetic flux barrier, the magnetic flux barrier having a width in the circumferential direction relative to the common axis; wherein said width in the circumferential direction is configured to be adjustable in a range from a position in which a first one of the two conductor core components contacts a second one of the two conductor core components to a position in which the first conductor core component is out of contact with the second conductor core component by rotating the inductor core components relative to each other around the common axis, wherein the inductor core comprises a first and a second base member and at least a first axially extending core member shaped and sized to provide a magnetic flux path between the first and second base members; wherein the first core member comprises a first set of projections axially extending from the first base member towards the second base member and a second set of projections axially extending from the second base member towards the first base member; where the projections of the second set interleave the projections of the first set so as to define a respective flux barrier between each projection of the second set and a respective adjacent projection of the first set.

15. The inductor core of claim 14, wherein a first one of the two separate inductor core components comprises the first base member and the first set of projections, and a second one of the two inductor core components comprises the second base member and the second set of projections.

16. The inductor core of claim 14, further comprising a second axially extending core member shaped and sized to provide a magnetic flux path between the first and second base members.

17. The inductor core of claim 16, wherein each of the two inductor core components comprises a part of the second core member.

18. The inductor core of claim 14, wherein the first set of projections each comprise a first lateral side face and a second lateral side face and wherein for at least one of the first set of projections, the first lateral side face is broader in a radial direction than the second lateral side face.

19. The inductor core of claim 18, wherein the second set of projections each comprise a first lateral side face and a second lateral side face, wherein for at least one of the second set of projections, the first lateral side face is broader in a radial direction than the second lateral side face, wherein the first lateral side face of the at least one of the first set of projections faces the first lateral side face of the at least one of the second set of projections.

20. An inductor core comprising two separate inductor core components which, when assembled with each other, together form the inductor core and define a common axis; wherein the inductor core components form at least one magnetic flux barrier, the magnetic flux barrier having a width in the circumferential direction relative to the common axis; wherein said width in the circumferential direction is configured to be adjustable in a range from a position in which a first one of the two conductor core components contacts a second one of the two conductor core components to a position in which the first conductor core component is out of contact with the second conductor core component by rotating the inductor core components relative to each other around the common axis; wherein a first one of the two inductor core components comprises a first set of projections and a second one of the two inductor core components comprises a second set of projections; wherein the projections of the second set interleave the projections of the first set so as to define a respective flux barrier between each projection of the second set and a respective adjacent projection of the first set, and wherein the first set of projections each comprise a first lateral side face and a second lateral side face and wherein for at least one of the first set of projections, the first lateral side face is broader in a radial direction than the second lateral side face.

21. The inductor core of claim 20, wherein the second set of projections each comprise a first lateral side face and a second lateral side face, wherein for at least one of the second set of projections, the first lateral side face is broader in a radial direction than the second lateral side face, wherein the first lateral side face of the at least one of the first set of projections faces the first lateral side face of the at least one of the second set of projections.

22. The inductor core of claim 20, wherein the two inductor core components have the same shape and size.

* * * * *